United States Patent
Hawkins et al.

(10) Patent No.: US 6,304,244 B1
(45) Date of Patent: Oct. 16, 2001

(54) METHOD AND SYSTEM FOR DYNAMICALLY SELECTING VIDEO CONTROLLERS PRESENT WITHIN A COMPUTER SYSTEM

(75) Inventors: Kelvin Craig Hawkins, Durham; John Matthew Landry, Wake Forest; Michael Thano Matthews, Cary, all of NC (US); Carl Leland Mohre, II, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/066,127

(22) Filed: Apr. 24, 1998

(51) Int. Cl.$^7$ ...................................... G09G 5/00
(52) U.S. Cl. .................. 345/132; 345/502; 345/520; 710/14
(58) Field of Search ................. 345/520, 3, 1, 345/132, 133, 502, 112; 710/10, 14

(56) References Cited

U.S. PATENT DOCUMENTS

| | | | |
|---|---|---|---|
| 4,862,156 | * | 8/1989 | Westberg et al. ............. 345/133 |
| 5,072,411 | * | 12/1991 | Yamaki ........................ 345/520 |
| 5,648,795 | * | 7/1997 | Vouri et al. ................. 345/132 |
| 5,659,715 | * | 8/1997 | Wu et al. ..................... 711/170 |
| 5,751,270 | * | 5/1998 | Rhodes et al. ............... 345/118 |
| 5,799,204 | * | 8/1998 | Pesto, Jr. ..................... 710/10 |
| 5,926,166 | * | 7/1999 | Khederzadeh et al. ....... 345/132 |

* cited by examiner

*Primary Examiner*—Dennis-Doon Chow
*Assistant Examiner*—Amr Awad
(74) *Attorney, Agent, or Firm*—Bernard D. Bogdon; Andrew Dillon (57) ABSTRACT

A method and system in a computer having a primary video controller for dynamically selecting an alternative video controller present within the computer. Initially, a diagnostic is performed to determine if alternative video controllers are connected to the computer system. A user is thereafter prompted to select an alternative video controller, if at least one alternative video controller is detected. The primary video controller is then temporarily disabled, in response to a selection of an alternative video controller. The alternative video controller is then automatically designated as the primary video controller, in response to the disabling of the primary video controller, such that the alternative video controller may be temporarily utilized as a primary video controller without altering internal computer system hardware settings or power cycling the computer system. The primary video controller may be implemented initially as an on-board video controller, while the alternative video controllers may be connected to the computer via adapter peripheral cards and slots.

15 Claims, 6 Drawing Sheets

Fig. 6

METHOD AND SYSTEM FOR DYNAMICALLY SELECTING VIDEO CONTROLLERS PRESENT WITHIN A COMPUTER SYSTEM

BACKGROUND OF THE INVENTION

1. Technical Field

The present invention relates in general to the field of information processing systems. In particular, the present invention relates to computer systems which display data via a video controller. More particularly, the present invention relates to computer systems wherein multiple video controllers may be utilized via adapter cards to produce video output. Still more particularly, the present invention relates to video controller support for computer systems.

2. Description of the Related Art

Video controllers permit computer users to view data displayed on a computer display unit by generating video signals. Video controllers are typically located on a computer's main system board (i.e., "on-board") or on an expansion board. Sometimes, however, the video controller may be constructed within the computer itself. Various types of video controllers are commonly utilized in computers, such as personal computers. Early personal computer designs, for example, included PC/AT or Industry Standard Architecture (ISA) expansion slots, which allowed users to install new features or upgrade on-board features with expansion cards. In such standard personal computer designs, if a user upgraded the on-board video graphics array (VGA) controller by adding an expansion card, the expansion card VGA controller by default became the sole source of video output.

In order to utilize the on-board VGA with a particular application, the user was forced to remove the expansion card, and could not dynamically switch VGA controllers in order to utilize a particular controller with a specific application. Also, the user could have only one expansion card VGA controller installed in the system at any one time. Such standard designs are commonly utilized in most personal computers on the market today, and are expected to remain an industry standard in the near future.

More recent personal computer designs include not only ISA expansion slots, but also Peripheral Component Interconnect (PCI) expansion slots. The "plug-and-play" nature of the PCI specification allows the user to install more than one expansion card of the same type without causing hardware conflicts. In the case of video controllers utilized in association with recent personal computer designs, an on-board PCI-based Super VGA (SVGA) controller is likely included within such computers, and a user may be able to add one or more SVGA controllers via PCI expansion slots. However, users are faced with additional problems when adding one or more video controllers via such expansion slots in PCI configurations. For example, a user may have an on-board 2D video controller for use with his or her primary operating system (e.g., Windows or OS/2), but may prefer to use a PCI adapter card with a 3D video controller for his or her favorite game in association with a different operating system (e.g., DOS). In order to successfully accomplish this task, the user typically is forced to reboot the computer after adding the new video controller via the expansion slot and/or reconfigure computer hardware. Such rebooting and reconfiguring activities are forms of power cycling.

These activities are typically time-consuming, and in the case of reconfiguring computer hardware, complicated and error prone. From the foregoing, it can be appreciated that what is needed to solve this problem is a method and system that would allow users to select between multiple video controllers in a given computer system without any excess hardware reconfiguration or power cycling, such as rebooting the computer. Such a method and system, if implemented, would save users both time and energy in switching between multiple video controllers. The disclosure presented herein solves this problem by presenting a method and system for dynamically switching between multiple video controllers present within a computer system.

SUMMARY OF THE INVENTION

It is an object of the present invention to provide an improved information processing system.

It is another object of the present invention to provide an improved computer system which displays data via video controllers.

It is yet another object of the present invention to provide an improved computer system in which multiple video controllers may be utilized via adapter cards and expansion slots to provide video output.

It is still another object of the present invention to provide improved video controller support for computer systems.

The above and other objects are achieved as is now described. A method and system are disclosed in a computer system having a primary video controller for dynamically selecting an alternative video controller present within the computer system. Initially, a diagnostic is performed to determine if alternative video controllers are connected to the computer system and a primary video controller is assigned. A user is thereafter able to select an alternative video controller, if at least one alternative video controller is detected. The primary video controller is then temporarily disabled, in response to a selection of an alternative video controller. The alternative video controller is then automatically designated as the primary video controller, in response to the disabling of the primary video controller, such that the alternative video controller may be temporarily utilized as a primary video controller without altering internal computer system hardware settings or power cycling the computer system. The primary video controller may be implemented initially as an on-board video controller, while the alternative video controllers may be connected to the computer via adapter peripheral cards and slots.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF PREFERRED EMBODIMENT

Figure 1:
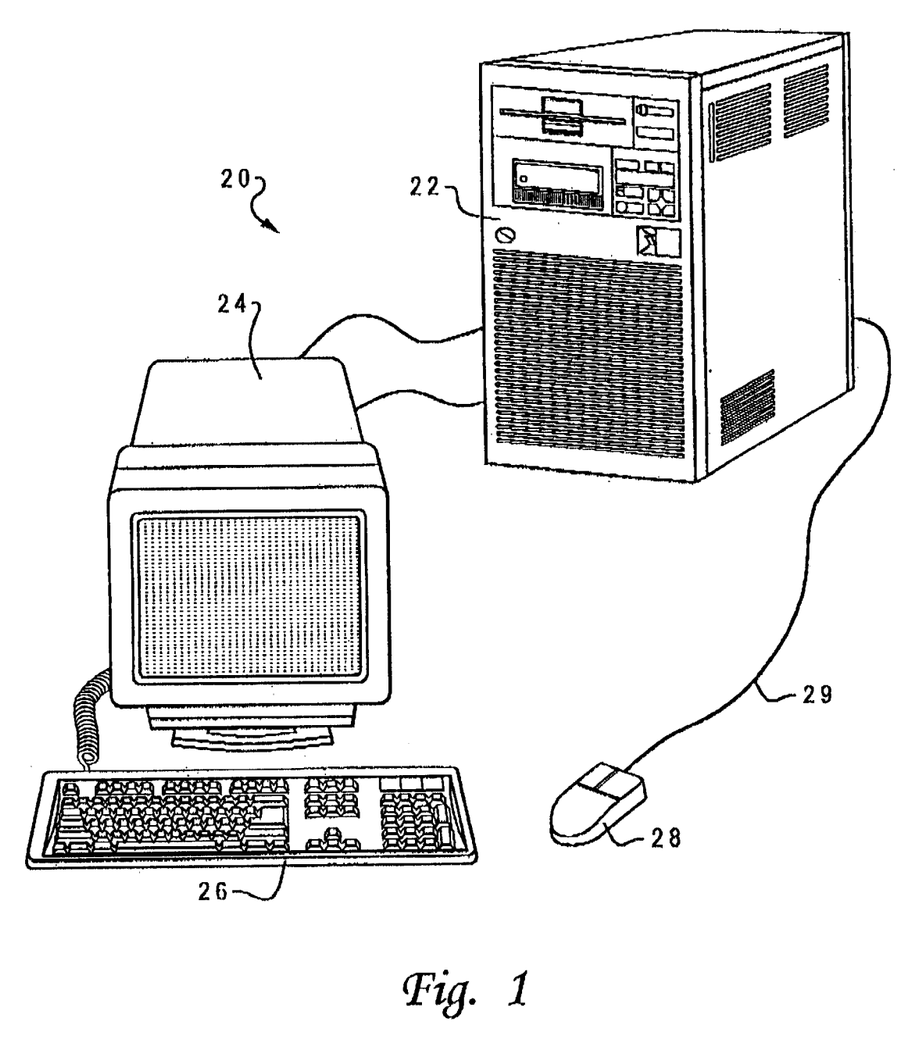
FIG. 1 illustrates a pictorial representation of a computer system which may be utilized to implement a preferred embodiment of the present invention.

With reference now to the figures and in particular with reference to FIG. 1, there is depicted a pictorial representation of a computer system which may be utilized to implement a preferred embodiment of the present invention. A computer system 20 is depicted that includes a system unit 22, a video display terminal 24, a keyboard 26, and a mouse 28. A cable 29 connects mouse 28 to system unit 22. Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display terminal 24. Keyboard 26 includes a standard set of printable characters presented in a QWERTY pattern typical of most typewriters. In addition, keyboard 26 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 24.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g, a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click." The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons. Thus, according to a preferred embodiment of the present invention, the user can utilize the mouse to place the graphical representation of a cursor (i.e. mouse pointer) over a desired hypertext link displayed within a computer screen of a video display terminal such as video display terminal 24, and then, utilizing the pointing device, "click" the mouse at the hypertext link to an Internet web page.

Figure 2:
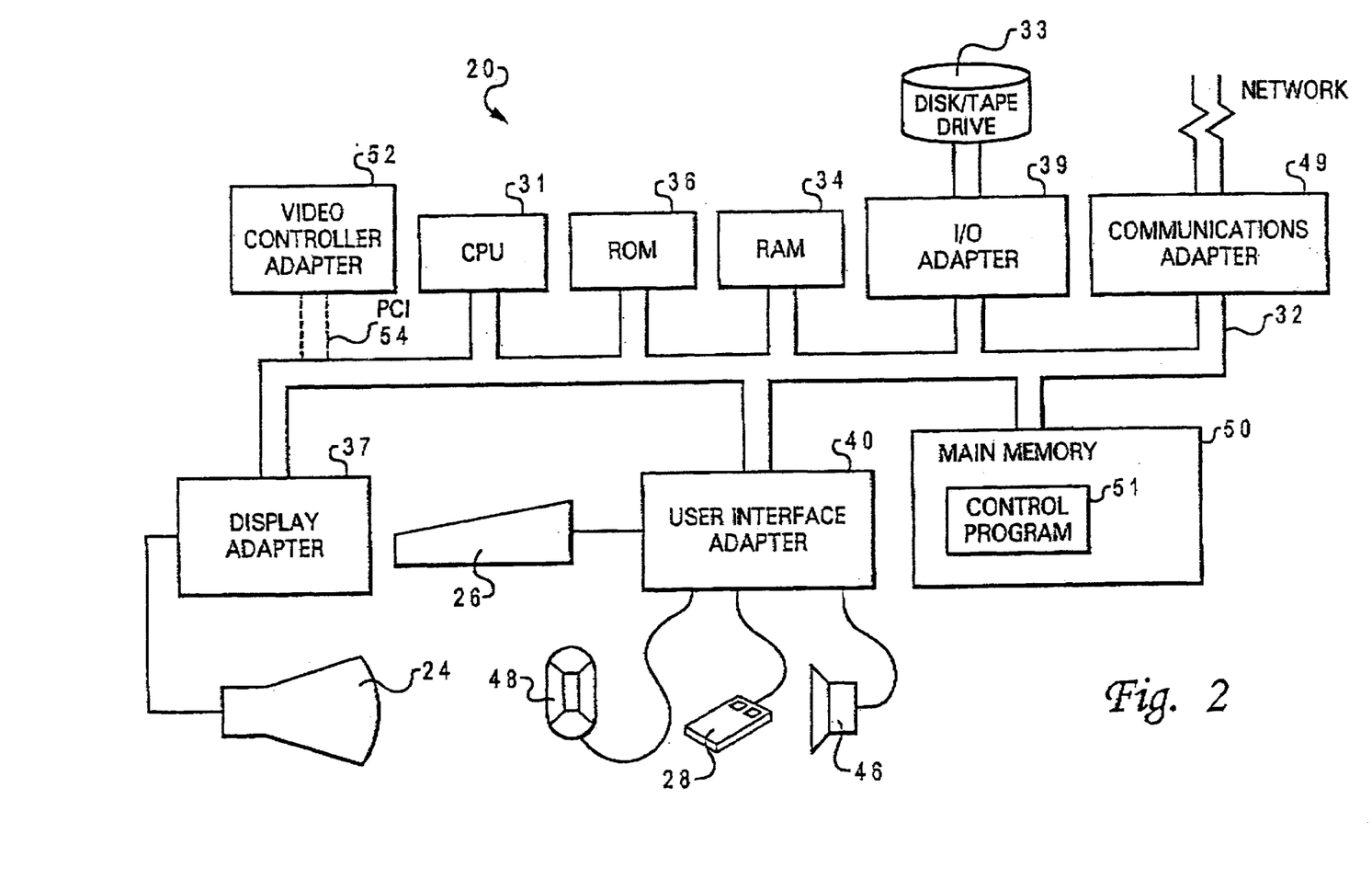
FIG. 2 depicts a representative hardware environment of the computer system illustrated in FIG. 1.

Computer system 20 can be implemented utilizing any suitable computer such as the IBM Aptiva™ computer system, a product of International Business Machines Corporation (IBM), located in Armonk, N.Y. However, those skilled in the art will appreciate that a preferred embodiment of the present invention can apply to any computer system, regardless of whether the computer system is a complicated multi-user computing apparatus or a single-user workstation or a network computer. In FIG. 1 and FIG. 2, like parts are identified by like numbers. Computer system 20 is thus a configuration that includes all functional components of a computer and its associated hardware. In general, a typical computer system includes a console or system unit such as system unit 22, with one or more disk drives, a monitor such as video display terminal 24, and a keyboard such as keyboard 26. Additional hardware, often referred to in the art as peripheral devices, can include devices such as printers, modems, and joysticks.

FIG. 2 depicts a representative hardware environment of the computer system illustrated in FIG. 1. Computer system 20 includes a Central Processing Unit ("CPU") 31, such as a conventional microprocessor, and a number of other units interconnected via system bus 32. CPU 31 includes a portion of computer system 20 that controls the operation of the entire computer system, including executing the arithmetical and logical functions contained in a particular computer program. Although not depicted in FIG. 2, CPUs such as CPU 31 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of computer system 20 can be implemented in a system unit such as system unit 22 of FIG. 1.

Computer system 20 further includes random-access memory (RAM) 34, read-only memory (ROM) 36, display adapter 37 for connecting system bus 32 to video display terminal 24, and I/O adapter 39 for connecting peripheral devices (e.g., disk and tape drives 33) to system bus 32. RAM 34 is a type of memory designed such that the location of data stored in it is independent of the content. Also, any location in RAM 34 can be accessed directly without having to work through from the beginning. ROM 36 is a type of memory that retains information permanently and in which the stored information cannot be altered by a program or normal operation of a computer.

Video display terminal 24 provides the visual output of computer system 20. Video display terminal 24 can be a cathode-ray tube (CRT) based video display well-known in the art of computer hardware. However, with a portable or notebook-based computer, video display terminal 24 can be replaced with a liquid crystal display (LCD) based or gas plasma-based flat-panel display. Computer system 20 further includes user interface adapter 40 for connecting keyboard 26, mouse 28, speaker 46, microphone 48, and/or other user interface devices, such as a touch-screen device (not shown), to system bus 32. Speaker 46 is one type of audio device that may be utilized in association with the method and system provided herein to assist diagnosticians or computer users in analyzing computer system 20 for system failures, errors, and discrepancies. Communications adapter 49 connects computer system 20 to a computer network. Although computer system 20 is shown to contain only a single CPU and a single system bus, it should be understood that the present invention applies equally to computer systems that have multiple CPUs and to computer systems that have multiple buses that each perform different functions in different ways.

Computer system 20 also includes an interface that resides within a machine-readable media to direct the operation of computer system 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIX windows windowing system can direct CPU 31. The AIX operating system is IBM's implementation of the UNIX™ operating system. "UNIX" is a trademark of UNIX Systems Laboratories, Inc. Other technologies also can be utilized in conjunction with CPU 31, such as touch-screen technology or human voice control.

Operating systems typically include computer software for controlling the allocation and usage of hardware resources such as memory, CPU time, disk space, and peripheral devices. The operating system is the foundation upon which applications, such as word-processing, spreadsheet, and web browser programs are built. Although not specifically depicted in computer system 20, expansion slots may also be included for adding adapters and devices such as video controllers as described herein. In addition, display adapter 37 may be configured as an on-board video controller which functions initially as a primary video controller.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 50 is connected to system bus 32, and includes a control program 51. Control program 51 resides within main memory 50, and contains instructions that, when executed on CPU 31, carry out the operations depicted in the logic flowchart of FIG. 7 and FIG. 8 described herein. The computer program product also can be referred to as a program product. Control program 51 contains instructions that when executed on CPU 31 can carry out logical operations such as those operations depicted in the logic flow charts of FIG. 7 and FIG. 8 described herein.

It is important to note that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as computer 20 depicted in FIG. 1 and FIG. 2 to transmit information over standard telephone lines.

Recent personal computer system designs include not only ISA expansion slots, but also Peripheral Component Interconnect (PCI) expansion slots. The plug-and play nature of the PCI specification allows users to install more than one expansion card of the same type without causing hardware conflicts. In the case of the video controller, the user likely has an on-board PCI-based Super VGA (SVGA) controller and can add one or more SVGA controllers through PCI expansion slots. In a preferred embodiment of the present invention, as described herein, a method and system are presented which allows users to dynamically select the primary source of video output when more than one PCI-based SVGA controller is present in a computer system, such as a personal computer.

For example, a user may have an on-board 2D (two-dimensional) video controller for use with his or her primary operation system (e.g., Windows 95 or OS/2), but may prefer to use a PCI adapter card with a 3D video controller for his or her favorite game in a different operating system (e.g., DOS). Computer system 20 is assumed to possess one PCI-based on-board SVGA controller and expansion slots for 3 PCI adapter cards. Each SVGA controller in computer system 20 is also assumed to support the Video Electronics Standards Association (VESA) Super VGA Standard Basic Input/Output System (BIOS) Extension through either the SVGA BIOS in the system board BIOS read-only memory (ROM) chip, or through the SVGA BIOS ROM chip on an expansion board. FIG. 2 depicts an example video controller adapter 52 connected to system bus 32 of computer system 20 via a PCI expansion slot 54. Those skilled in the art will appreciate that computer system 20 may be modified to include additional PCI expansion slots (e.g., expansion slots for 3 PCI adapter cards).

Figure 3:
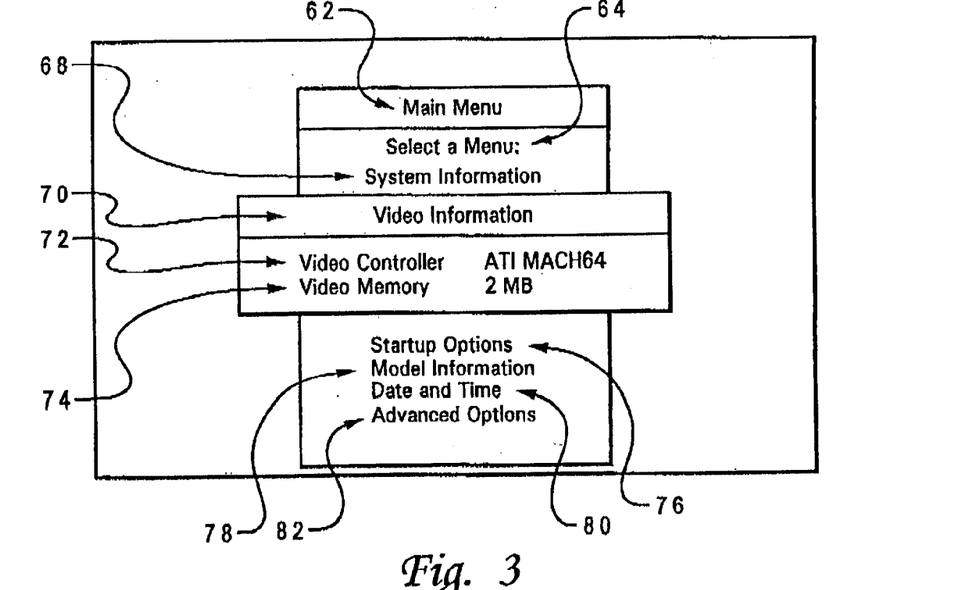
FIG. 3 illustrates an example of a video information menu without a video adapter installed within a computer system, according to a preferred embodiment of the present invention.

The method and system described herein can be expanded to support any number of PCI adapter cards up to the maximum allowed by the PCI bus electrical specification. It is also assumed that the user has a separate monitor for each SVGA controller, or that the user can connect the monitor to an SVGA port for the video controller that is selected as a primary video controller. For user convenience, a single monitor may be connected to more than one video output of the computer system via a commercially available switching box. The user interface for the primary video controller is provided via a ROM-based "setup" utility that is normally included in a BIOS ROM chip on the personal computer system board. FIG. 3 illustrates an example of a video information menu without a video adapter installed within a computer system, according to a preferred embodiment of the present invention. When only the on-board SVGA controller is present, a "video information" menu in the setup utility displays the following information, as indicated in FIG. 3:

| Video Controller | OEM text string |
|---|---|
| Video Memory | x MB |

The information above is presented within a video information menu 70, which is included under a system information heading 68, as depicted in FIG. 3. As indicated at selection menu 64, a user is prompted via "select a menu" to choose particular system information, including video information, start-up options 76, model information 78, data and time information 80 and advanced options 82. Although not specifically illustrated in FIG. 3, those skilled in the art will appreciate that users may select other particular system information, including audio information, disk drives, input/output ports, power management, and "plug and play" features. Within video information menu 70, information is presented related to video controller 72 and video memory 74. As specifically indicated within FIG. 3, video controller 72 is associated with "ATI MACH64". Video memory 72 is associated with "2MB" of video memory. All of the above mentioned categories are listed under a main menu 62 in FIG. 3, which users can access to select particular system information. Both the OEM text string and the number of megabytes (MB) of video memory are available through the VESA Return Super VGA Information BIOS Extension.

When the user adds a second SVGA controller via a PCI expansion slot (i.e., designated PCI-1) when only the on-board SVGA has been present in the past, the system Power On Self Test (POST) logic in the BIOS ROM assumes the new SVGA controller should be selected as the primary controller. In this case, the POST logic leaves the on-board SVGA controller disabled. The "video information" menu in the setup utility then displays the following information, as illustrated in FIG. 4:

| Video Controller | OEM text string |
| Video Memory | x MB |
| Primary Video Controller | PCI-1 Adapter |

Figure 4:
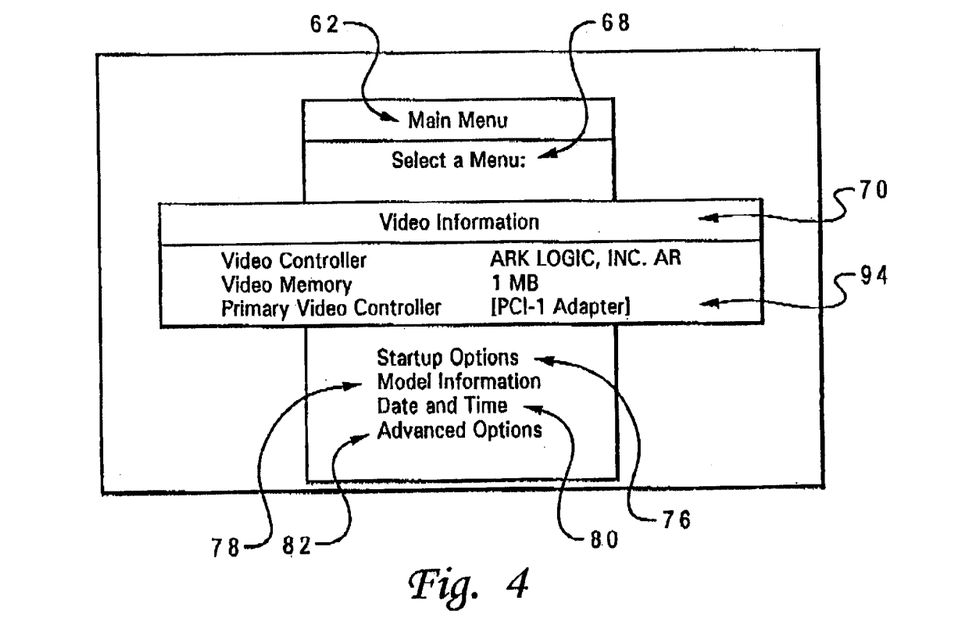
FIG. 4 depicts an example of a video information menu with a peripheral component interconnect video adapter installed within a computer system, in accordance with a preferred embodiment of the present invention.
Figure 5A:
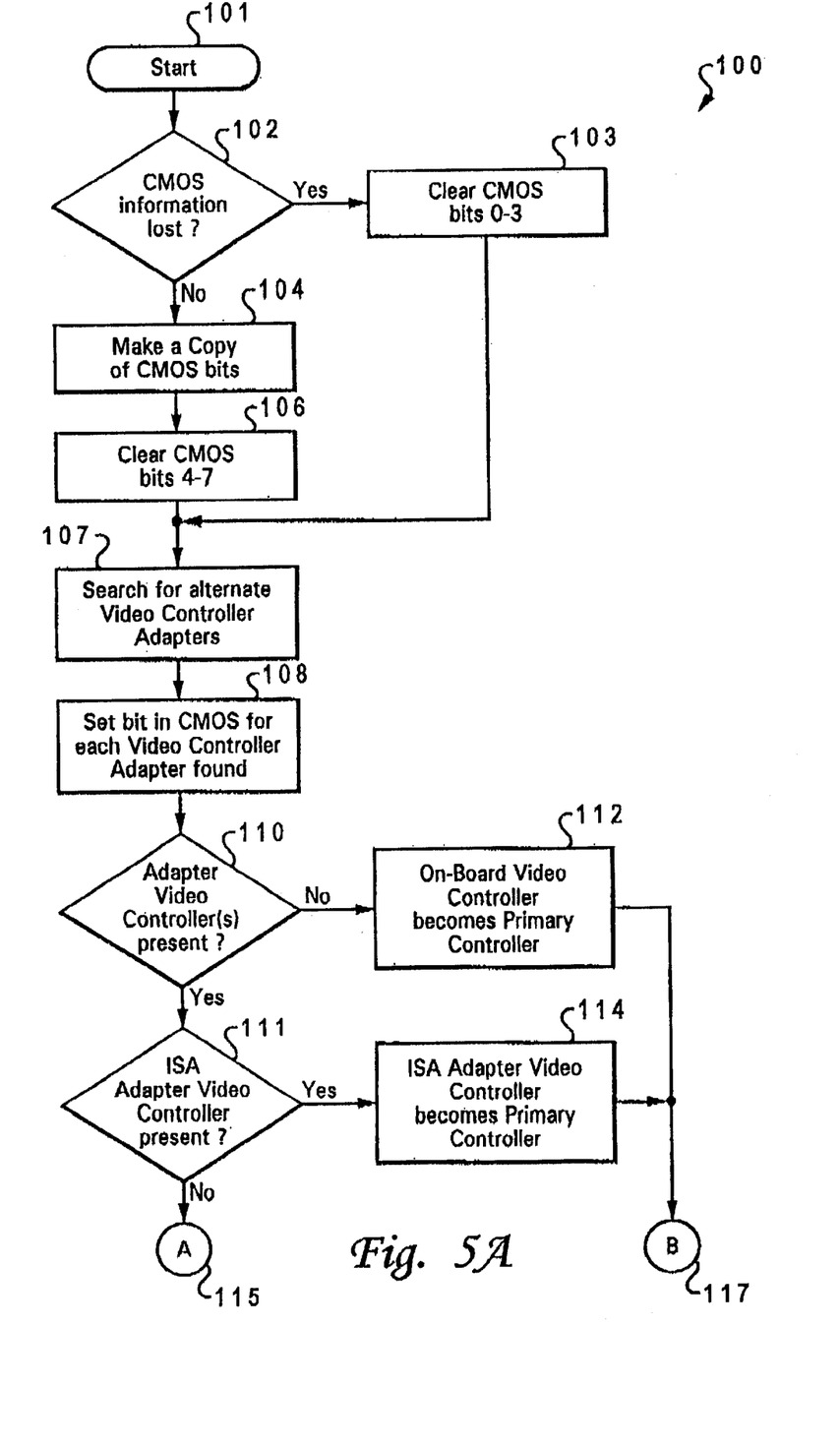
FIG. 5(a) illustrates a high level logic flow diagram that shows steps in the process utilized to carry out system initialization with the primary video controller, according to a preferred embodiment of the present invention.
Figure 5B:
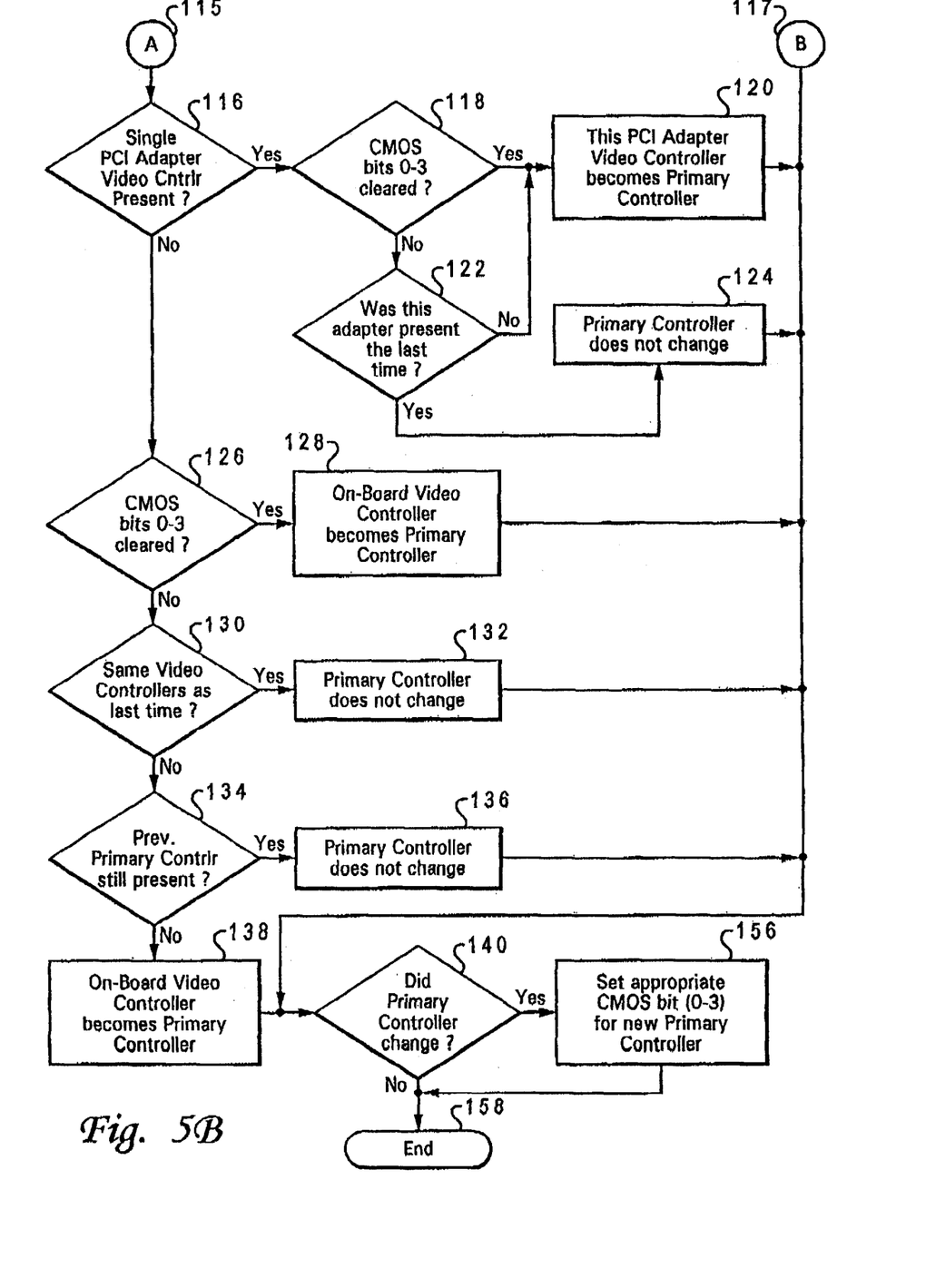
FIG. 5(b) depicts continued steps in the high level logic flow diagram of FIG. 5(a), according to a preferred embodiment of the present invention.

FIG. 4 depicts an example of a video information menu 70 with a peripheral component interconnect video adapter installed within a computer system, in accordance with a preferred embodiment of the present invention. The configuration depicted in FIG. 4 enables a user to select an alternative video controller, if at least one alternative video controller is detected. Note that in FIG. 3 and FIG. 4, similar elements are indicated by like reference numerals. The primary video controller 94 that appears in the video information menu 70 may be changed by the user to select either the "PCI-1 Adapter" or an on-board SVGA controller as the primary video controller. If the user alters the options presented in video information menu 70 to select "onboard," the setup utility requires the system to reboot and the POST logic utilizes the information stored in system nonvolatile memory (CMOS) to determine which SVGA controller should be enabled and which should be left disabled. The user may thus choose which SVGA controller to enable prior to booting an operating system without changing the internal hardware configuration and without having to recycle the power to the computer system in which the aforementioned video controllers operate. In order to support as many as three PCI expansion slots (i.e., designated PCI-1, PCI-2, and PCI-3) and the possibility of having an ISA video controller installed as well, the system BIOS reserves one byte of CMOS random-access memory (RAM) with the following bit definitions:

Bit 0: On Board selected as primary video controller
Bit 1: PCI-1 Adapter selected as primary video controller
Bit 2: PCI-2 Adapter selected as primary video controller
Bit 3: PCI-3 Adapter selected as primary video controller
Bit 4: ISA video controller installed
Bit 5: PCI-1 video controller installed
Bit 6: PCI-2 video controller installed
Bit 7: PCI-3 video controller installed FIG. 5(a) illustrates a high level logic flow diagram 100 that shows steps in the process utilized to carry out system initialization with the primary video controller, according to a preferred embodiment of the present invention. FIG. 5(b) depicts continued steps in the high level logic flow diagram 100 of FIG. 5(a), according to a preferred embodiment of the present invention. The system POST may utilize the logic presented within high level logic flow diagram 100 when setting up the system with the proper primary video controller. As illustrated initially at block 101, the process described in FIG. 5(a) is initiated. As described thereafter at block 102, a test is performed to determine if CMOS information has been lost. If it is determined that CMOS information has been lost, then as indicated at block 103, CMOS bits 0 to 3 are cleared and the process continues, as indicated thereafter at block 107 (i.e., to be described momentarily). If it is determined that CMOS information has not been lost, then as indicated at block 104, a copy of the CMOS RAM is made in order to obtain the previous configuration of video controllers for use in making a decision on the new configuration.

As subsequently depicted at block 106, CMOS bits 4 through 7 are cleared in case the installed video adapter configuration has been altered since the previous POST. Then, as described at block 107, the system searches for alternate adapter video controllers. For example, the POST may search for the presence of ISA and PCI SVGA adapter cards. As thereafter described at block 108, for each type of video controller found, an appropriate bit is set. A particular bit is set in the CMOS for each adapter video controller found. As thereafter illustrated at block 110, a test is performed to determine if adapter video controllers are present. If no adapter video controllers are found to be present, then as illustrated at block 112, the on-board video controller becomes the primary video controller. For example, in the case of an SVGA, the on-board SVGA controller would become the primary video controller. Following completion of the operation described at block 112, the process continues, as described at block 117, which is illustrated in greater detail in FIG. 5(b).

If one or more adapter video controllers are found to be present, then as indicated at block 111, a test is performed to determine if ISA adapter video controllers are present. If it is determined that an ISA video controller is present, then as indicated at block 114, the ISA video controller becomes the primary video controller, because ISA cards are generally enabled by hardware and cannot be disabled. The on-board SVGA controller is left disabled in this particular instance. Following completion of the operation described at block 114, the process continues to block 117, which is described in greater detail in FIG. 5(b). If it is determined that an ISA adapter video controller is not present, then the process continues, as described at block 115, which is illustrated in greater detail in FIG. 5(b).

As indicated thereafter at block 116, a test is performed to determine if only one PCI adapter video controller is present within the computer system. If it is determined that only one PCI adapter is installed, an additional test is then performed, as depicted at block 118 to determine if CMOS bits 0 to 3 have been cleared. If CMOS bits 0 to 3 have been cleared, then as indicated at block 120, the PCI adapter video controller found to be present within the computer system (i.e., according to the test performed, as indicated at block 116) becomes the primary video controller. Following completion of the operation described at block 120, the process continues, as indicated at block 140. If it is determined, as depicted at block 118, that CMOS bits 0 to 3 have not been cleared, then as indicated at block 122, a test is performed to determine if the single PCI adapter video controller identified (i.e., as illustrated at block 116) was present the last time the computer system was in operation. If not, then the operation performed, as described at block 120, is processed. If so, then as indicated at block 124, the primary video controller does not change.

Following completion of the operation described at block 124, the process continues, as indicated at block 140. If, as indicated at block 116, it is determined that a single PCI adapter video controller is not present within the computer system, then as illustrated at block 126, a test is performed to determine if CMOS bits 0 to 3 have been cleared. If it is determined that CMOS bits 0 to 3 have been cleared, then as depicted at block 128, the on-board video controller becomes the primary video controller. Following completion of the operation described at block 128, the process continues, as described at block 140. If it is determined that CMOS bits 0 to 3 have not been cleared, then as illustrated at block 130, a test is performed to determine if the video controllers present are the same video controllers that were present the last time that the user activated the computer system.

If it is determined that the video controllers present are the same video controllers present the last time that the user activated the computer system, then as indicated at block 132, the primary video controller does not change. Following completion of the operation depicted at block 132, the process continues, as illustrated at block 140. If it is determined that the video controllers present are the same video controllers present the last time the user activated the computer system, then as described at block 134, a test is performed to determine if the previous primary controller utilized the last time the user activated the computer system is still present within the computer system. If the previous primary video controller is still present, then as illustrated at block 136, the primary video controller does not change. Following completion of the operation described at block 136, the process continues, as indicated at block 140.

If it is determined that the previously utilized primary video controller is not present within the computer system, the on-board video controller becomes the primary video controller, as illustrated at block 138. As illustrated at block 140, a test is performed to determine if the primary video controller has changed. If it is determined that the primary video controller has changed, then as indicated at block 156, appropriate CMOS bits (0 to 3) are set for the new primary video controller. For example, if POST makes a change in which a controller is enabled as the primary video controller, POST sets the appropriate bit (0 to 3) to reflect the new primary video controller. If the primary video controller has not changed, then as indicated at block 158, the process ends. Following completion of the operation described at block 156, the process also terminated, as indicated at block 158.

Figure 6:
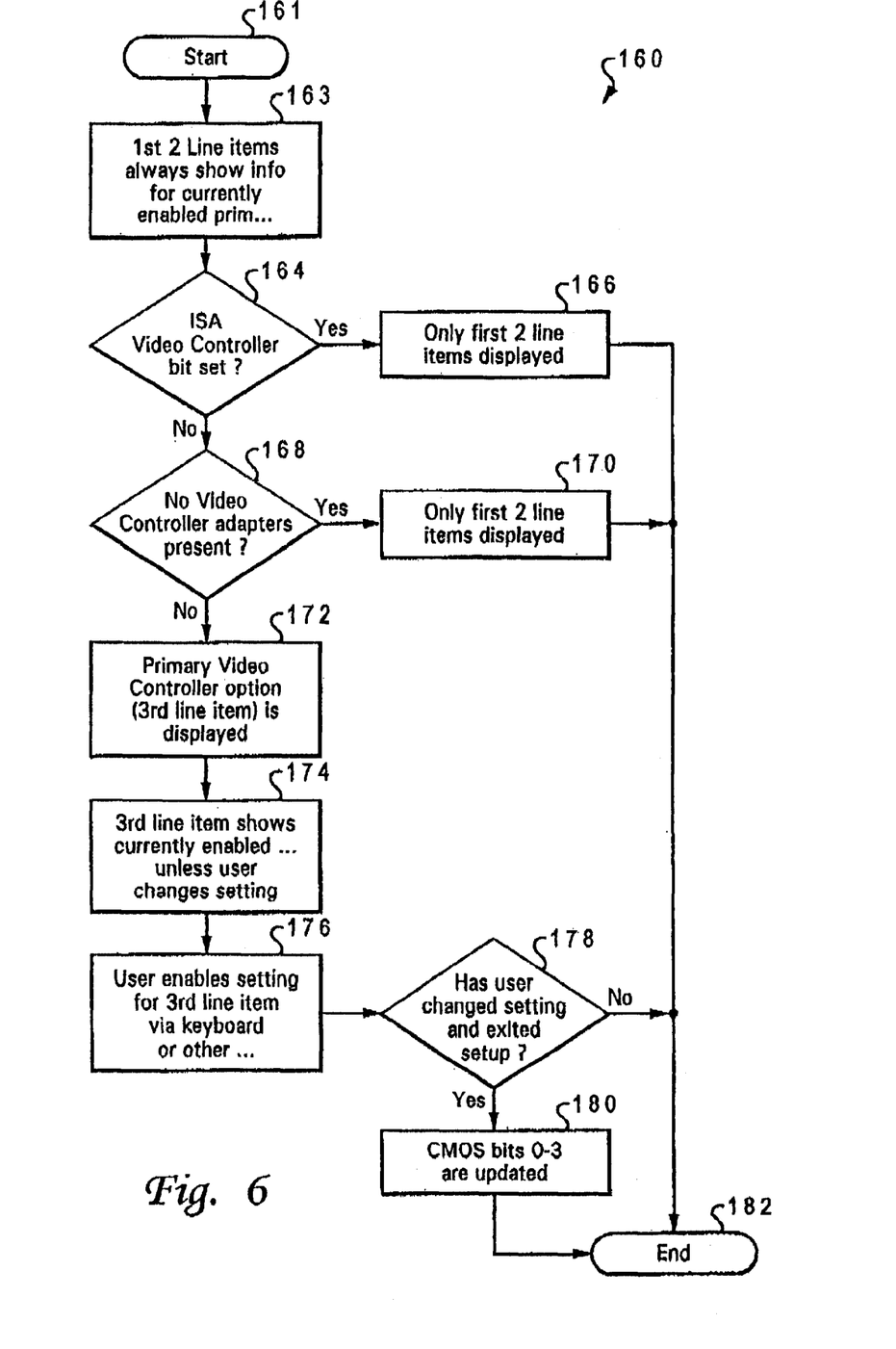
FIG. 6 illustrates a high level logic flow diagram for the process of implementing a user interface for the primary video controller selection, according to a preferred embodiment of the present invention.

FIG. 6 illustrates a high level logic flow diagram 160 for the process of implementing a user interface for the primary video controller selection, according to a preferred embodiment of the present invention. As described at block 161, the process for implementing a user interface for the primary video controller selection is initiated. As indicated at block 163, the Video Controller and Video Memory line items reflect the information for the currently selected primary video controller. In essence, the first 2 line items always display information for the currently enabled primary video controller. As illustrated at blocks 164 and 166, if the ISA video controller bit is set, then only the first 2 line items are displayed. For example, according to these steps, only the Video Controller and Video Memory lines of the menu are displayed. This is because ISA cards are assumed to be enabled by hardware and generally cannot be disabled. If no ISA or PCI adapter card is installed, according to CMOS bits 4 through 7, then only the Video Controller and Video Memory lines of the menu are displayed because only the on-board SVGA controller is present, as indicated at blocks 168 and 170.

As illustrated at block 168, a test is performed to determine if no adapter video controllers are present. If no adapter video controllers are present within the computer system, then as illustrated at bock 170, only the first two line items are displayed. However, if an adapter video controller is present, then as indicated at block 172, a Primary Video Controller option (i.e., third line item) is displayed. As described at block 174, the third line item shows the currently enabled primary video controller, unless the user alters the settings. For example, the currently selected video controller shown at the third line item may be composed of the On-Board video controller, the PCI-1 Adapter, the PCI-2 Adapter, or the PCI-3 Adapter, unless the user changes the setting.

As described at block 176, the user may alter the setting for the 3rd line item via the keyboard or other user input devices. For example, if the user makes a change in the Primary Video Controller option, an asterisk (*) appears to the left of the line item to indicate that a change in primary controller is pending. If the Primary Video Controller option is displayed, the user may select the setting for that option using the right or left arrow key from the keyboard to view possible settings for that option. Other appropriate user input devices may be utilized to view possible settings for that option, depending on a particular implementation of a preferred embodiment of the present invention. The possible settings for that particular option are displayed according to which of CMOS bits 4 through 7 are set. Only video controllers that are installed in the system are displayed as possible settings, so that the user cannot select a PCI slot that does not contain a video controller card. As illustrated at block 178, a test is then performed to determine if the user has changed the setting and exited the Setup Utility. If not, the process simply ends, as illustrated at block 182. If so, then as indicated at block 180, CMOS bits 0 to 3 are updated to reflect the new setting and the system forced back through POST to set up the new primary video controller. The process then terminates, as indicated at block 182.

It can be appreciated by those skilled in the art that FIG. 5(*a*), FIG. 5(*b*) and FIG. 6 present a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 depicted in FIG. 1 and FIG. 2, in processing electrical or other (e.g. mechanical, chemical) physical signals to generate other desired physical signals.

At a high level, the flow diagrams presented herein implement a method and system in a computer having a primary video controller for dynamically selecting an alternative video output present within the computer. Initially, a diagnostic is performed to determine if alternative video controllers are connected to the computer system. A user is enabled to select alternative video controllers, if alternative video controllers are present. The user is thus prompted to select an alternative video controller, if at least one alternative video controller is detected. The primary video controller is then temporarily disabled, in response to a selection of an alternative video controller. The alternative video controller is finally automatically designated as the primary video controller, in response to the disabling of the primary video controller, such that the alternative video controller may be temporarily utilized as a primary video controller without altering internal computer system hardware settings or power cycling the computer system.

Power cycling of the computer system may include activities such as rebooting or restarting the computer system. Although rebooting and/or restarting the computer system are typically accomplished manually by a user, such activities may be accomplished automatically, in response to particular parameters monitored by the computer system, depending upon a particular computer system implementation. The primary video controller may be implemented initially as an on-board video controller, while the alternative video controllers may be connected to the computer via adapter peripheral cards and slots.

According to the method and system described herein, the system BIOS no longer forces the primary video controller based on the traditional priority scheme, but allows the user maximum flexibility. In addition, a user can now choose between multiple video controllers in a personal computer independently of the operating system(s) he or she is using. A user can now also choose between multiple video controllers in a personal computer system without any hardware configuration changes or power cycling. Only POST re-initialization is required for the video controller change to take effect before the user can run the desired application or operating system with the new video controller.

The method and system presented herein also provides a user interface for choosing the primary video controller only when other options are available in the hardware. This prevents confusion for the user who may not be aware of advanced features provided via expansion slots. In addition, the method and system presented herein provides a user interface for choosing the primary video controller that only presents options which are available in the hardware configuration. This prevents the user from selecting a configuration that is not possible or that could cause a system hang condition.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method, in a computer system having two or more video controllers and at least one nonvolatile memory that includes a basic input/output system (BIOS), for dynamically specifying which of said two or more video controllers is to be utilized as a default video controller, said method comprising:

in response to starting said computer system, automatically executing code from said BIOS that identifies a current aggregation of video controllers in said computer system;

in response to said identification, automatically executing code from said BIOS that designates a first video controller among said current aggregation of video controllers as a default video controller;

executing code from said BIOS that utilizes said default video controller to display a setup screen;

in response to said displaying of said setup screen, executing code from said BIOS that receives a first user input selecting a second video controller among said current aggregation of video controllers;

in response to said selection, executing code from said BIOS that utilizes said selected video controller for output without altering internal computer system hardware settings or power cycling said computer system;

receiving a second user input selecting any video controller among said current aggregation of video controllers other than said second video controller as a newly selected video controller;

in response to receipt of said second user input, utilizing said newly selected video controller for output, such that multiple selected video controllers are utilized in succession without manipulating internal hardware settings of said computer system or power cycling said computer system; and executing code from said BIOS that automatically designates said newly selected video controller as said default video controller in response to a subsequent starting of said computer system.

2. The method of claim 1, wherein the step of utilizing said default video controller to display said setup screen comprises utilizing said default video controller to prompt said user for said first user input.

3. The method of claim 1, wherein:

the method comprises a preceding step of recording, in said at least one nonvolatile memory, a previous aggregation of video controllers in said computer system in response to a previous power cycle of said computer system;

the method further comprises determining that said current aggregation does not match said previous aggregation; and the step of designating said first video controller as said default video controller is performed in response to said determination.

4. The method of claim 1, wherein:

said first video controller comprises an adapter video controller that is connected to said computer system via a peripheral expansion slot;

said second video controller comprises an on-board video controller of said computer system;

the step of automatically designating a first video controller as a default video controller comprises designating said adapter video controller as said default video controller;

the step of utilizing said default video controller to display a setup screen comprises utilizing said adapter video controller to display said setup screen; and the step of utilizing said selected video controller for output comprises utilizing said on-board video controller for output.

5. A computer system having two or more video controllers and facilities for dynamically specifying which of said two or more video controllers is to be utilized as a default video controller, said computer system having at least one nonvolatile memory containing a basic input/output system (BIOS) comprising:

means, responsive to starting said computer system, for automatically identifying a current aggregation of video controllers in said computer system;

means, responsive to said identification, for automatically designating a first video controller among said current aggregation of video controllers as a default video controller;

means for utilizing said default video controller to display a setup screen;

means, responsive to said displaying of said setup screen, for receiving a first user input selecting a second video controller among said current aggregation of video controllers;

means, responsive to said selection, for utilizing said selected video controller for output without manipulating internal hardware settings of said computer system or power cycling said computer system;

means for receiving a second user input before a subsequent starting of said computer system, wherein said second user input selects any video controller among said current aggregation of video controllers other than said second video controller as a newly selected video controller;

means for utilizing said newly selected video controller for output, such that multiple selected video controllers are utilized in succession without manipulating internal hardware settings of said computer system or power cycling said computer system; and means, responsive to said subsequent starting of said computer system, for automatically designating said newly selected video controller as said default video controller.

6. The computer system of claim 5, wherein said means for utilizing said default video controller to display said setup screen comprises means for utilizing said default video controller to prompt said user for said first user input.

7. The computer system of claim 5, wherein:

said computer system comprises means, responsive to a previous power cycle of said computer system, for recording, in said at least one nonvolatile memory, a previous aggregation of video controllers in said computer system;

said computer system also comprises means for determining that said current aggregation does not match said previous aggregation; and said means for designating said first video controller as said default video controller performs said designation in response to said determination.

8. The computer system of claim 5, wherein:

said first video controller comprises an adapter video controller that is connected to said computer system via a peripheral expansion slot;

said second video controller comprises an on-board video controller of said computer system;

said means for automatically designating a first video controller as a default video controller comprises means for automatically designating said adapter video controller as said default video controller;

said means for utilizing said default video controller to display a setup screen comprises means for utilizing said adapter video controller to display said setup screen; and said means for utilizing said selected video controller for output comprises means for utilizing said on-board video controller for output.

9. A program product for dynamically specifying which of two or more video controllers in a computer system is to be utilized as a default video controller, said program product including basic input/output system (BIOS) program code comprising:

instruction means, responsive to starting said computer system, for automatically identifying a current aggregation of video controllers in said computer system;

instruction means, responsive to said identification, for automatically designating a first video controller among said current aggregation of video controllers as a default video controller;

instruction means for utilizing said default video controller to display a setup screen;

instruction means, responsive to said displaying of said setup screen, for receiving a first user input selecting a second video controller among said current aggregation of video controllers;

instruction means, responsive to said selection, for utilizing said selected video controller for output without manipulating internal hardware settings of said computer system or power cycling said computer system;

instruction means, responsive to a subsequent starting of said computer system, for automatically designating said selected video controller as said default video controller;

instruction means for receiving a second user input before a subsequent starting of said computer system, wherein said second user input selects any video controller among said current aggregation of video controllers other than said second video controller as a newly selected video controller;

instruction means for utilizing said newly selected video controller for output, such that multiple selected video controllers are utilized in succession without manipulating internal hardware settings of said computer system or power cycling said computer system; and a computer usable medium encoding said instruction means for automatically identifying, said instruction means for automatically designating said first video controller, said instruction means for utilizing said default video controller, said instruction means for receiving, said instruction means for utilizing said selected video controller, said instruction means for automatically designating said selected video controller, said instruction means for receiving a second user input, and said instruction means for utilizing said newly selected video controller.

10. The program product of claim 9, wherein said instruction means for utilizing said default video controller to display said setup screen comprises instruction means for utilizing said default video controller to prompt said user for said first user input.

11. The program product of claim 9, wherein:

said computer usable medium also encodes instruction means, responsive to a previous power cycle of said computer system, for recording, in at least one nonvolatile memory of said computer system, a previous aggregation of video controllers in said computer system;

said computer usable medium also encodes instruction means for determining that said current aggregation does not match said previous aggregation; and said instruction means for designating said first video controller as said default video controller performs said designation in response to said determination.

12. The program product of claim 9, wherein:

said instruction means for automatically identifying a current aggregation of video controllers comprises instruction means for automatically identifying an adapter video controller that is connected to said computer system via a peripheral expansion slot and instruction means for automatically identifying an on-board video controller of said computer system;

said instruction means for automatically designating a first video controller as a default video controller comprises instruction means for automatically designating said adapter video controller as said default video controller;

said instruction means for utilizing said default video controller to display a setup screen comprises instruction means for utilizing said adapter video controller to display said setup screen; and said instruction means for utilizing said selected video controller for output comprises instruction means for utilizing said on-board video controller for output.

13. The program product of claim 9, wherein said computer usable medium comprises signal bearing media.

14. The program product of claim 13, wherein said signal bearing media comprises transmission media.

15. The program product of claim 13, wherein said signal bearing media comprises recordable media.

* * * * *